(12) United States Patent
Takahashi et al.

(10) Patent No.: US 6,499,882 B2
(45) Date of Patent: Dec. 31, 2002

(54) SLIDING BEARING

(75) Inventors: Takeshi Takahashi, Nara-ken (JP);
Yasuo Takamura, Nara-ken (JP)

(73) Assignee: Koyo Seiko Co., Ltd. (JP)

( * ) Notice: Subject to any disclaimer, the term of this patent is extended or adjusted under 35 U.S.C. 154(b) by 0 days.

(21) Appl. No.: 09/842,220

(22) Filed: Apr. 25, 2001

(65) Prior Publication Data
US 2001/0038725 A1 Nov. 8, 2001

(30) Foreign Application Priority Data

Apr. 27, 2000 (JP) ........................................ 2000-124086
Feb. 1, 2001 (JP) ........................................ 2001-025117

(51) Int. Cl.$^7$ ............................................... F16C 17/10
(52) U.S. Cl. ........................ 384/107; 384/121; 384/124
(58) Field of Search ................................. 384/107, 121, 384/123, 124, 115

(56) References Cited
U.S. PATENT DOCUMENTS 5,433,529 A    7/1995   Hensel ........................ 384/112
5,806,987 A  * 9/1998   Nose et al. ................... 384/100
5,876,124 A  * 3/1999   Zang et al. ................... 384/107
5,879,084 A    3/1999   Hensel ........................ 384/112
6,036,369 A    3/2000   Ichiyama ..................... 384/119

* cited by examiner

Primary Examiner—Lenard A. Footland
(74) Attorney, Agent, or Firm—Adams & Wilks

(57) ABSTRACT

The improved sliding bearing provides fitting of a cap into a sleeve with steadily fixation of adhesive, and prevention of the remained adhesive outside of the desired area. The sliding bearing comprises a sleeve, a shaft enclosed in said sleeve, and, a cap fitted into the sleeve, the sleeve having a shouldered hole with a first shoulder on which the cap is held, wherein the internal circumferential surface of the sleeve or the external circumferential surface of the cap includes a second shoulder circumferentially formed thereon. The second shoulder of the sleeve is of an outer diameter larger than the diameter of the cap, and an inner diameter approximately same as or slightly larger than the outer diameter of the cap, while the second shoulder of the cap is of an inner diameter smaller than that of the sleeve, and an outer diameter approximately same as or slightly smaller than the inner diameter of the sleeve.

4 Claims, 4 Drawing Sheets

SLIDING BEARING

FIELD OF THE INVENTION

The present invention relates to a sliding bearing, e.g. a dynamic pressure bearing. More particularly, the present invention relates to a dynamic pressure bearing in which a shaft member is held in its sleeveportion for relative rotation to radial bearing portion.

BACKGROUND OF THE INVENTION

FIGS. 1 and 2 show a general sliding bearing, e.g., a dynamic pressure bearing. There are, respectively, shown different types of dynamic pressure bearings.

Referring to FIG. 1, the first type of dynamic pressure bearing is shown, as an example. Such the dynamic pressure bearing is provided with a shaft member 1 having a shaft body portion 2a and a flange 2b on one of the end faces of the shaft body portion 2a. The flange 2b has first dynamic pressure grooves 3, 4 respectively formed on its front and back surface to act as a radial bearing portion, while the shaft body portion 2a has the second dynamic pressure grooves 5, 6, respectively, formed on its outer circumferential surface to act as an axial bearing portion.

The shaft member 1 is fitted into a sleeve portion 7, and thus the second dynamic pressure grooves 5,6 may be formed on the inner circumferential surface of the sleeve portion 7. In the dynamic pressure bearing, the fitting of the shaft member 1 into the sleeve portion 7 forms a gap between the external surface of shaft member 1 and the inner circumferential surface of the sleeve portion 7, wherein the gap acts as a flow path to allow flow of lubricating fluid.

The sleeve portion 7 has a stepped hole 8, which is formed by construction of a small diameter hole portion 8a extending toward the interior, a large diameter hole portion 8b extending toward the exterior from the small diameter hole portion 7a through a shoulder portion 8c, and a cap-fitting hole 8d extending to the exterior from the large diameter hole 8c through a first shoulder portion 8e. The shaft member 1 is fitted into the stepped hole 8 until placement of the flange 2b in the large diameter hole portion 8b. After fitting of the shaft member 1 into the stepped hole 8, a cap 9 is fitted in the cap-fitting hole portion 8d and placed on the second shoulder portion 8e for the purpose of closure of the stepped hole 8.

For fitting of the cap 9, a press fitting or adhesive bonding process is performed. The press-fitting fixation process is a simple way of handling and provides a relatively steadily fixed cap, but has problems of which it limits bearing dimensions. Herefrom, the fixation by adhesive bonding process is generally performed, because of no limitation to bearing dimensions.

Referring to FIG. 2, a second type of dynamic pressure bearing is shown. The dynamic pressure bearing is distinguished from the foregoing first type of dynamic pressure bearing body, in construction of the shaft member, protrusion of the shaft body 2a beyond the flange 2b or formation of the flange around the outer circumferential surface of the shaft member 1. In the second type of dynamic pressure bearing, the cover member 9 has an axial center hole 91 into which the shaft member 1 passes. Since other elements are of similar construction to the first type of dynamic pressure bearing as shown in FIG. 1, the descriptions are omitted.

Referring to FIG. 7, a conventional fixation of the cap 9 into the cap-fitting hole portion 8d of the sleeve portion 7 by the adhesive bonding process is shown. According to the figure, the sleeve portion 7 has a peripheral tapered edge 7a at its top, while the cover member has a perimetrical tapered edge 9a at its top. After fitting of the cap 8 into the cap-fitting hole portion 8d, an adhesive glue B is supplied into an area A where is at the peripheral and perimetrical tapered edges 7a and 9a, from above of the cap 9, and thereby penetrates into a gap G between the sleeve portion 7 and the cap 9.

Because of the guiding of the cap 9 fitted into the cap-fitting hole portion 8d, or the prevention of back-lush or play between the tubular member 7 and the cap 9 incorporated thereinto, a gap formed between the inner circumferential surface of the sleeve portion 7 and the outer circumferential surface of the cap 9 is designed for smaller dimensions. This does not accomplish complete penetration of the adhesive glue B which is infused in the area A, into the gap through slopes of the tapered edges of the sleeve portion 7 and the cap 9, and hence causes problems of which the adhesive glue B remains in the area A or on the external surfaces of the sleeve portion 7 and the cap 9, whereby provides reduced fixation of the cap into the sleeve portion 7 by and required works for removal of the adhesive glue B being left.

SUMMARY OF THE PRESENT INVENTION

The present invention is devised to solve the foregoing Problems. Therefore, an object of the present invention is to allow the smooth penetration of the adhesive glue into the gap between the inner circumferential surface of the sleeve portion and the outer circumferential surface of the cap through slopes of the tapered edges.

To attain the object of the invention, an improved sliding bearing (dynamic pressure bearing) has a gap, which is formed in construction of an upper large gap portion which provides the smooth penetration of the adhesive glue thereinto, and a lower small gap portion which provides the prevention of back-lush or play between the sleeve portion and the cap thereof.

The gap with the upper wide gap and the lower narrow gap is defined by the sleeve portion provided with a second internal shoulder at its lower portion near the second shoulder, or a cap provided with a circumferential shoulder at its lower portion near the bottom.

In another embodiment, the inner circumferential surface of the sleeve portion, and the outer circumferential surface of the cap are each provided with a lateral groove in which the adhesive glue anchors thereinto. The lateral grooves have an internal top surface, which is tapered so as to allow the adhesive glue to smoothly penetrate thereinto for more effective fixation of the cap in the sleeve portion.

DETAILED DESCRIPTION OF THE PREFERRED EMBODIMENTS

The description of the present invention exemplifies general dynamic pressure bearings having an improved gap between the inner circumferential surface of the sleeve portion and the outer circumferential surface of a cap.

Figure 1:
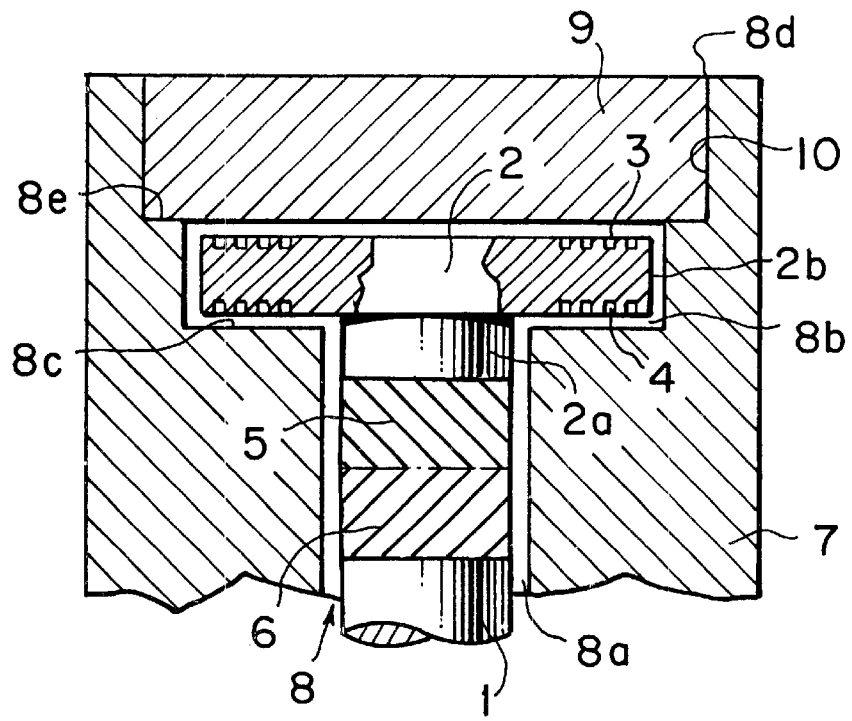
FIG. 1 is a sectional view of the first type of dynamic pressure bearing.
Figure 2:
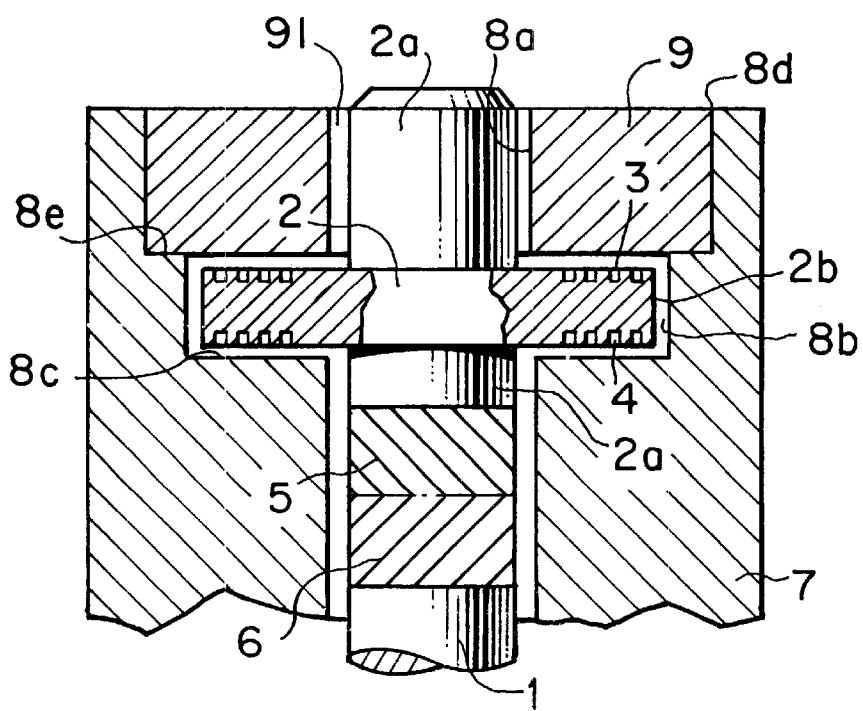
FIG. 2 is a sectional view of the second type of dynamic pressure bearing.

Referring to FIGS. 1 and 2, the general dynamic pressure bearings are each shown. The dynamic pressure bearing comprises a shaft member 1 having a shaft body portion 2a, a flange portion 2b formed on one of the end surfaces, or around the outer circumferential surface of the shaft body portion 2a, and first dynamic pressure grooves 3, 4 formed on front and back surfaces of the flange portion 2b to act as an axial bearing portion, the shaft member 1 being fitted into a sleeve portion 7. It further comprises second dynamic pressure grooves 5, 6 formed on either of at least the outer circumferential surface of the shaft body portion 2a, or the inner circumferential surface of the sleeve portion 7.

With reference to the dynamic pressure bearing as shown in FIG. 2, the end portion of the shaft body portion 2a protrudes beyond the flange 2b and fits a center hole of the cap 9 that is fitted into the sleeve portion 7, as described above.

Figure 3:
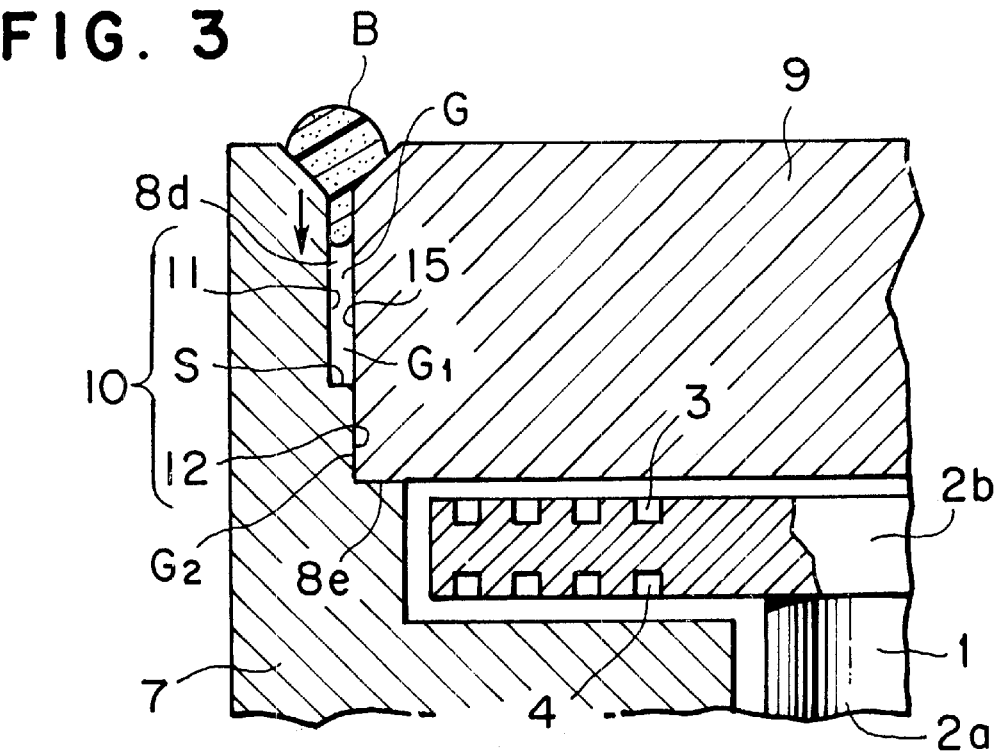
FIG. 3 is an enlarged sectional view of an improved gap of the dynamic pressure bearing as shown in FIG. 1, wherein the sleeve portion includes a shoulder portion on its inner circumferential surface.
Figure 4:
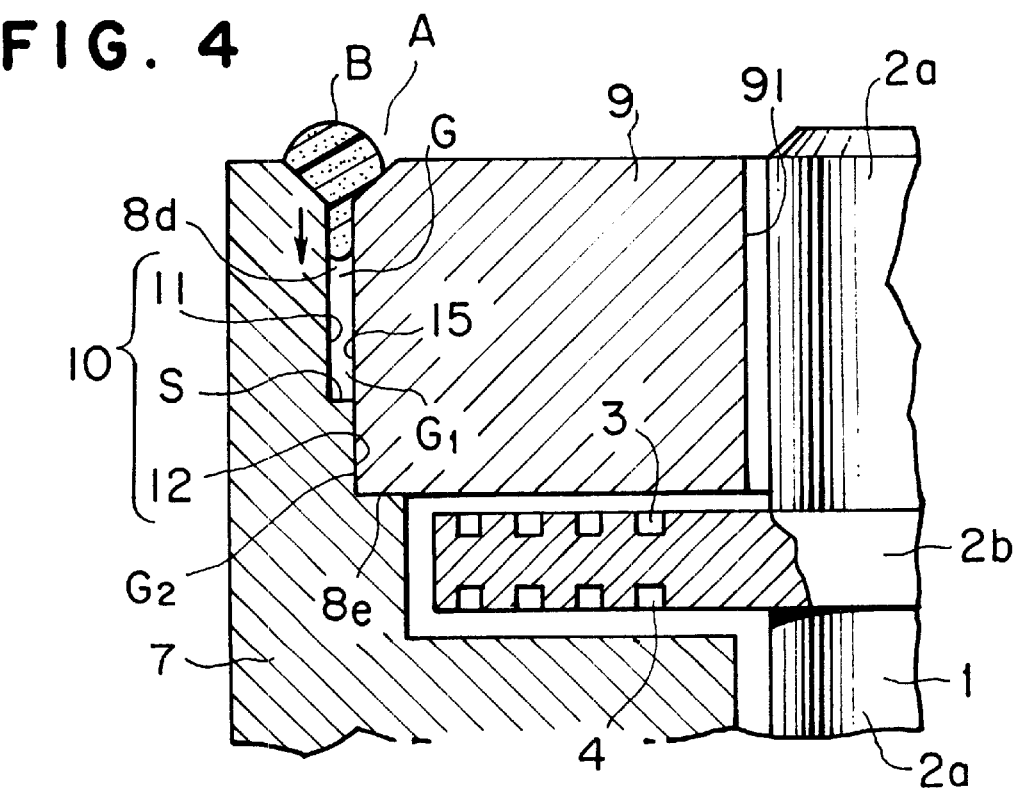
FIG. 4 is an enlarged sectional view of an improved gap of the dynamic pressure bearing as shown in FIG. 2, wherein a sleeve portion includes a shoulder portion on its inner circumferential surface.

Referring to FIGS. 3 and 4, an enlarged sectional view of an improved gap G of the dynamic pressure bearing as shown in FIGS. 1 and 2 is shown, respectively. The sleeve portion 7 has a second shoulder portion S such that a large diameter hole and a small diameter hole are formed in the interior thereof. The large diameter hole has a diameter larger than that of the outer circumferential surface 15 of the cap 9, while the small diameter hole has a diameter substantially same as or slightly larger than that of the outer circumferential surface 15 of the cap 9. Thus, the gap G, which is formed by fitting the cap 9 into the sleeve portion 7, produces a broad gap portion G1 and a narrow gap portion G2.

Preferably, the second shoulder portion S is defined by a cut rings from the internal surface of the sleeve potion 7 between its top portion and its lower portion near the second shoulder portion S, because of the steadily fixed cap.

Figure 5:
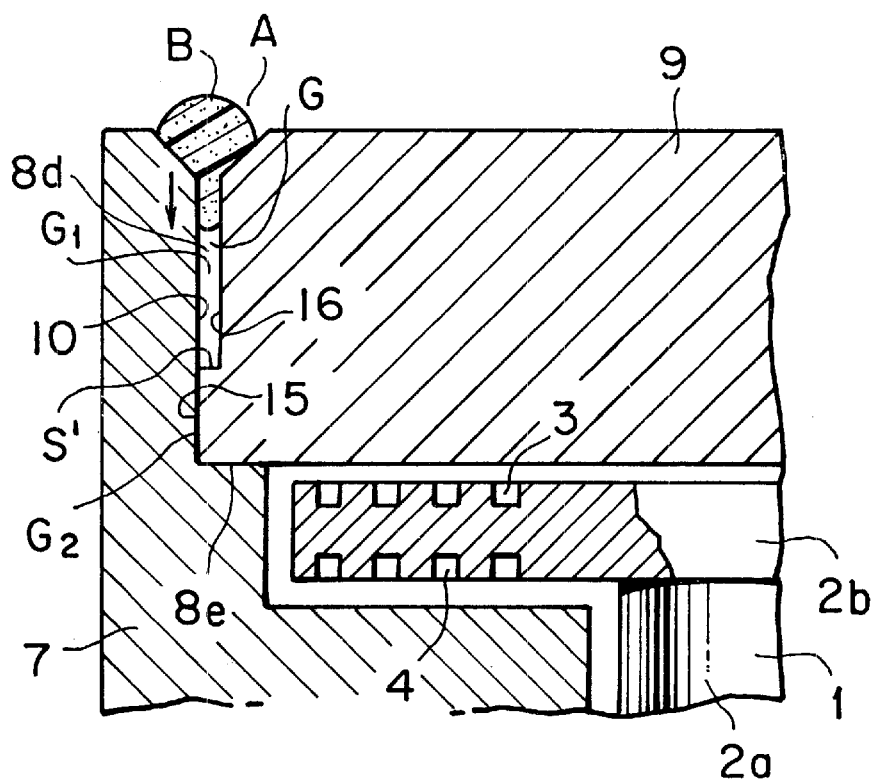
FIG. 5 is an enlarged sectional view of an improved gap of the dynamic pressure bearing as shown in FIGS. 1 and 2, wherein a cap includes a shoulder portion on its outer circumferential surface.

Referring to FIG. 5, the gap G in construction of the broad upper gap portion G1 and the narrow lower gap portion G2, instead of the gap produced by the shoulder portion S of the sleeve portion 7, may be produced by a shoulder surface S' of the cap 9. The shoulder surface S' appears by design of the cap 9 having the upper outer circumferential surface 16 with the diameter smaller than the inner diameter of the cap 9.

It will be understood from the foregoing that the second shoulder portion S of the sleeve portion 7 has the outer diameter larger than that of the cap 9 and an inner diameter approximately same as or slightly larger than the outer diameter of the cap 9, while the second shoulder portion S' of the cap has an outer diameter approximately same as or slightly smaller than the inner diameter of the sleeve portion 7 and the inner diameter smaller than that of the sleeve portion 7.

With the foregoing construction of the gap between the sleeve portion 7 and the cap 9, the broad gap portion G1 acts so as to permit of a smoothly penetrating adhesive glue B into the gap G, while the narrow gap portion G2 acts so as to allow prevention of lash-back or play of the cover member 9 in the sleeve potion 7.

In the foregoing construction of the improved gap G, the adhesive glue B, that is infused from above of the dynamic pressure bearing for fixation of the cap 9 to the sleeve portion 8, smoothly intrudes into the broad gap portion G1 of the gap G, and then are drawn into the narrow gap portion G2 of the gap G by capillary attraction from the latter. Furthermore, the small gap portion G2 itself provides, as above described, steadier fixation of the cap 9 into the sleeve portion 7.

Figure 6:
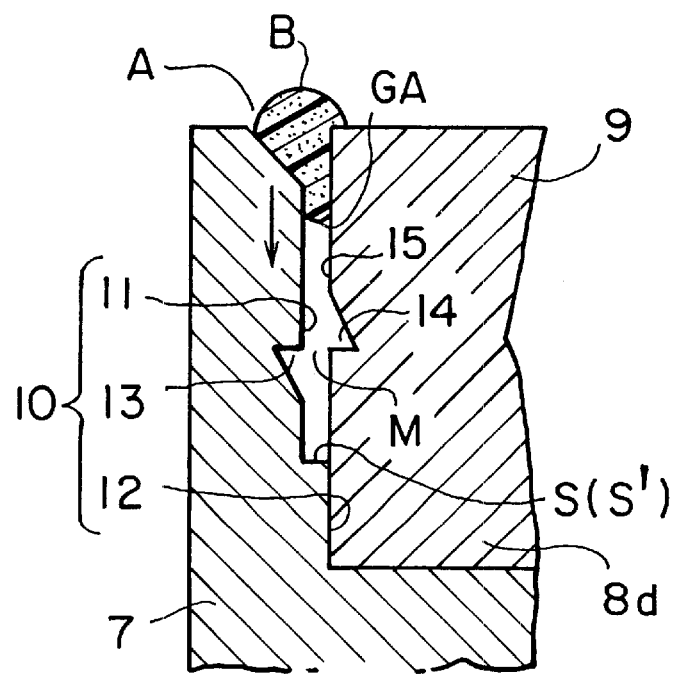
FIG. 6 is an enlarged section view of a further improved gap of the dynamic bearing as shown in FIGS. 3, 4, and 5, wherein both or either of the sleeve portion and the cap includes circumferential lateral grooves.
Figure 7:
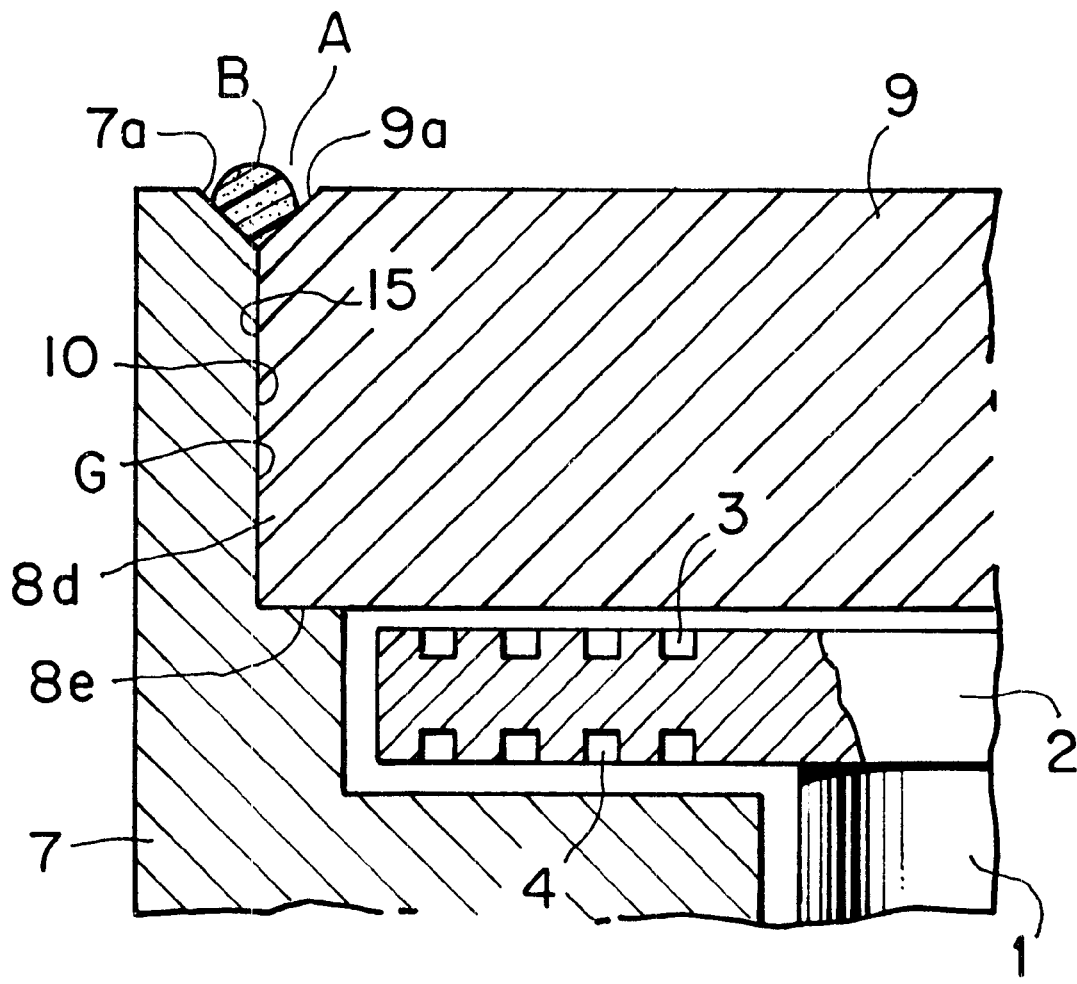
FIG. 7 is an enlarged sectional view of which the cap member is fixed into the cap-fitting hole by means of the conventional adhesive process.

Referring to FIG. 6, an enlarged sectional view of a further improved gap of the dynamic pressure bearing as shown in FIGS. 3, 4, 5 is shown. In the gap GA, the sleeve 7 is provided with a first circumferential lateral groove 13 on its internal circumferential surface, while the cap 9 is provided with a second lateral groove 14 on its external circumferential surface. The purpose of the first and second lateral grooves 13, 14 is to create advantageous anchor effect produced by the adhesive glue intruding thereinto.

Preferably, the first lateral groove 13 on the internal circumferential surface of the sleeve portion 7 is tapered inwardly from the lower portion near the bottom to the middle portion M in the upward direction away from the external circumferential surface of the cap, while the second groove 14 on the circumferential surface of the cover member 9 is tapered inwardly from the upper portion near the middle portion M to the middle portion M in the downward away from the internal circumferential surface 11 of the sleeve portion 7.

Thus, the adhesive glue B, which is infused from above of the dynamic pressure bearing is smoothly drawn into the lateral grooves. For the purpose of the created anchor effect, both or either of the first and second lateral grooves 13, 14 may be provided in the internal circumferential surface of the sleeve portion 7 and/or the external circumferential surface of the cap 9. Further, instead of the grooves, either or both of the internal circumferential surface of the sleeve portion 7 or the cap 9 of the external circumferential surface may have recesses formed in circumferentially-spaced-apart relation thereon at the predetermined intervals.

In the foregoing construction of the further improved gap G according to FIG. 6, the adhesive glue smoothly intruding into the broad gap portion 11 as indicated by an downwardly directed arrow is drawn into both or either of the first lateral groove 13 on the internal circumferential surface of the sleeve portion 7, and second lateral groove 14 on the external circumferential surface of the cap 9, and then penetrates into the narrow gap portion 12 by the capillary attraction. The drawn adhesive solidifies in both or either of the first and second lateral grooves 13, 14, whereby the cap 9 is steadily anchored in the cap-fitting hole 8a of the sleeve portion 7.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A sliding bearing comprising:
   (a) a sleeve having a shouldered hole provided with a first circumferential shoulder
   (b) a shaft enclosed in said sleeve;
   (c) a cap fitted in said sleeve and held on the first circumferential shoulder of said sleeve such that one of openings of the shouldered hole of said sleeve;
   (d) a gap formed between the internal circumferential surface of said sleeve and the external circumferential surface of said cap;
   (e) an adhesive which is drawn into said gap; and
   said gap including a broad gap at its upper portion and a narrow gap at its lower portion extending from the broad gap, each of the broad gap and the narrow gap being defined by formation of a second shoulder on the internal circumferential surface of said sleeve or the external circumferential surface of said cap.

2. The sliding bearing as claimed in claim 1, wherein at least one of the internal circumferential surface of said sleeve, and the external circumferential surface of said cap includes a lateral circumferential groove or a plurality of recess formed thereon at the broad gap of said gap.

3. The sliding bearing as claimed in claim 1, wherein at least one of the first internal circumferential surface of said sleeve member, and the second external circumferential surface of said cap includes a lateral circumferential groove or a plurality of recess formed therein.

4. A sliding bearing comprising:
   (a) a sleeve member having a shouldered hole with an internal circumferential surface and a first circumferential shoulder formed along the internal circumferential surface;
   (b) a shaft member enclosed in a shouldered hole of said sleeve member;
   (c) a cap fitted in the shouldered hole of said sleeve member for one closure of said shouldered hole and held on the first circumferential shoulder of said sleeve member, the cap having an external circumferential surface;
   either of said sleeve member or said cap having a second circumferential shoulder, the second circumferential shoulder being circumferentially formed along the internal circumferential surface of said sleeve member or the external circumferential surface of said cap, the internal circumferential surface of said sleeve member with the formed second circumferential shoulder, and the external circumferential surface of said cap with the formed second circumferential shoulder, respectively, having a first internal circumferential surface with its diameter larger than that of the external circumferential surface of said cap and a second internal circumferential surface connecting with the first internal circumferential surface through said second shoulder, the second internal surface circumferential surface having its diameter approximately same as or slightly larger than that of the external circumferential surface of said cap, and a first external circumferential surface with its diameter smaller than that of the internal circumferential surface of said sleeve member and a second external circumferential surface with its diameter approximately same as or slightly smaller than that of the internal circumferential surface of said sleeve member, respectively; and
   (d) adhesive infused between the internal circumferential surface of said sleeve member and the external circumferential surface of said cap for fixation of said cap into the shouldered hole of said sleeve member.

* * * * *